Patented May 14, 1935

2,001,246

UNITED STATES PATENT OFFICE 2,001,246

MANUFACTURE OF PAPER

Orvon P. Gephart, Miamisburg, Ohio, assignor to Howard D. Meincke

No Drawing. Original application March 5, 1931, Serial No. 520,481. Divided and this application July 13, 1932, Serial No. 622,363

5 Claims. (Cl. 92—21)

The present invention relates to improvements in connection with the manufacture of paper and more particularly to improvements in the manufacture and incorporation of fillers.

The methods which have heretofore been made to utilize clay, calcium carbonate or calcium sulfate (either in its natural crystalline form as gypsum, or after partial or complete calcining) as a filler or as a coating medium in connection with the manufacture of paper, the difficulties in dispersion of the filling or coating material, lack of retention by the pulp or fiber and lack of coating power have afforded serious difficulties, notwithstanding the marked advantages of the materials by reason of their low cost and whiteness.

It has now been discovered that the effect of these materials as fillers or coating materials may be markedly changed by the procedure hereinafter described.

In accordance with this invention, a relatively small proportion of a readily suspensible colloid such as aluminum hydrate is admixed with the clay, gypsum or calcium carbonate. It is preferred to accomplish this result by the addition of small proportions of alum with an alkaline lime compound such as lime, calcium carbonate or hydrated lime. Obviously, in the case of the calcium carbonate it is not necessary to add lime, the addition of alum being sufficient. The proportion of the soluble aluminum compound is in general less than 10% of the amount of the filler, and the proportion of the alkaline lime compound is so controlled that when the composite product is incorporated in water, a resulting solution will have a pH suitable for the process in which the filler is to be used. In general in paper making, it is desired to have the solution either approximately neutral or slightly acid. The proportion of the alum may in general be from 5–35 parts by weight for each 100 parts of the filler, and the proportion of the lime compound from 1–15 parts by weight. A typical preparation in accordance with the present invention may be prepared by admixing thoroughly with 100 parts of finely ground natural gypsum, 8 parts by weight of alum, and 2.5 parts by weight of hydrated lime.

The ingredients may be mixed dry, the mixture being subsequently incorporated in water, although it is preferred to pre-mix the materials while moist and permit them to dry at a temperature below that at which the colloidal effect of the aluminum hydrate is adversely affected. Either the partially or completely calcined gypsum may be substituted for the natural gypsum without substantial modification of the proportion of the ingredients employed. Likewise, similar proportions may be incorporated in the case of clay. In the case of calcium carbonate, alum only need be added. On account of the fact that part of the calcium carbonate reacts with the alum, slightly less alum should be added than with the clay or gypsum.

Instead of lime, other alkalies may be added, such as sodium, potassium or ammonium hydroxide. Likewise, the aluminum hydrate may be separately prepared and directly incorporated in the mixture.

When the mixture is incorporated in water, a markedly improved dispersion and prolongation of the time of settling of the filling material is noted. When the suspension thus produced is incorporated in paper pulp in a suitable mixer or beater, it is found that the retention of the filling material is markedly increased.

The filling material may be incorporated with the paper pulp either in the beater, in the stuff chest, or upon the Fourdrinier screen.

On incorporation of suitable casein or starch sizes with a filler prepared in accordance with the present invention, the resulting material may be used as a coating material or surface size in the preparation of paper, and will be found to have a markedly increased hiding power and the whiteness of the coated paper will be greatly improved.

This application is a division of my co-pending application Serial No. 520,481, filed March 5, 1931.

The foregoing detailed description has been given for clearness of understanding only, and no unnecessary limitations should be understood therefrom, but the appended claims should be construed as broadly as permissible, in view of the prior art.

I claim:

1. In the preparation of paper, the method of incorporating calcium sulfates therein, which comprises incorporating in the paper pulp a dispersion of calcium sulfate containing small proportions of a soluble aluminum compound and an alkaline lime compound.

2. In the manufacture of paper, the method of incorporating calcium sulfate therein which comprises introducing into the paper pulp a dispersion of calcium sulfate containing small proportions of an alum and hydrated lime.

3. The method of improving the filler in paper pulp which comprises incorporating with calcium sulfate small amounts of a soluble aluminum compound and an alkaline lime compound, thereby increasing the dispersibility of the calcium sulfate, and then adding the above described mixture to paper pulp.

4. In the manufacture of paper, a method of incorporating calcium sulfate therein which comprises introducing into the paper pulp a dispersion of calcium sulfate containing 5–35 parts of alum and 1–15 parts of lime for each 100 parts of calcium sulfate.

5. In the manufacture of paper, a method of incorporating calcium sulphate therein which comprises introducing into the raw paper pulp 100 parts of finely ground natural gypsum, approximately 8 parts by weight of alum, and approximately 2.5 parts by weight of hydrated lime.

ORVON P. GEPHART.